(12) United States Patent
Shetty

(10) Patent No.: US 11,651,527 B2
(45) Date of Patent: May 16, 2023

(54) AUGMENTED REALITY BASED IMAGE PROTECTION IN ENTERPRISE SETTINGS

(71) Applicant: VMWARE, INC., Palo Alto, CA (US)

(72) Inventor: Rohit Pradeep Shetty, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/469,931

(22) Filed: Sep. 9, 2021

(65) Prior Publication Data
US 2023/0022133 A1 Jan. 26, 2023

(30) Foreign Application Priority Data
Jul. 22, 2021 (IN) .............................. 202141033002

(51) Int. Cl.
| | |
|---|---|
| G06T 11/00 | (2006.01) |
| H04N 5/232 | (2006.01) |
| G01C 21/20 | (2006.01) |
| H04N 5/272 | (2006.01) |
| G06V 10/22 | (2022.01) |
| G06V 20/20 | (2022.01) |
| G06F 21/62 | (2013.01) |

(52) U.S. Cl.
CPC ............ *G06T 11/00* (2013.01); *G01C 21/206* (2013.01); *G06F 21/62* (2013.01); *G06V 10/22* (2022.01); *G06V 20/20* (2022.01); *H04N 5/23218* (2018.08); *H04N 5/232945* (2018.08); *H04N 5/272* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2008/0030588 A1* | 2/2008 | Boss | H04N 5/23203 386/E5.072 |
| 2013/0142384 A1* | 6/2013 | Ofek | G06V 10/806 382/103 |
| 2019/0128676 A1* | 5/2019 | Naik | G01S 19/48 |
| 2020/0077035 A1* | 3/2020 | Yao | G06V 20/52 |
| 2020/0134222 A1* | 4/2020 | Walker | G06F 21/602 |

\* cited by examiner

*Primary Examiner* — Kyle Zhai
(74) *Attorney, Agent, or Firm* — Thomas Horstemeyer, LLP

(57) ABSTRACT

Disclosed are various examples for augmented reality based image protection in enterprise settings. In one example, a managed camera application can generate an artificial reality based camera user interface using image data from a field of view of a camera. An indoor position can be identified using global positioning system (GPS) and indoor positioning data. A sector of the field of view can be identified as a protected image area that depicts a protected or confidential object, and the user interface can be updated to include an AR user interface element that is generated relative to the protected image area that is identified.

20 Claims, 7 Drawing Sheets

AUGMENTED REALITY BASED IMAGE PROTECTION IN ENTERPRISE SETTINGS

RELATED APPLICATION

Benefit is claimed under 35 U.S.C. 119(a)-(d) to Foreign Application Serial No. 202141033002 filed in India entitled "AUGMENTED REALITY BASED IMAGE PROTECTION IN ENTERPRISE SETTINGS", on Jul. 22, 2021, by VMware, Inc., which is herein incorporated in its entirety by reference for all purposes.

BACKGROUND

Many enterprises, due to the secure nature of their operations, might restrict employee usage of cameras in enterprise facilities. Most mobile phones are equipped with cameras, so employee phone usage has to be restricted as well. For example, an enterprise might mandate that mobile phones cannot be brought on premises, or require employees to manually seal mobile phone cameras while entering premises. Some enterprises can require that device management software be installed to a mobile phone, enabling the enterprise to impose restrictions on camera usage through a management service.

However, existing technologies can impose blanket restrictions on camera usage. These restrictions are not foolproof and can also lead to employee disillusionment or dissatisfaction. Smartphones can be central to a person's lifestyle. In addition, many enterprises can utilize mobile phone cameras for enterprise workflows and activities. As a result, blanket restrictions can be undesirable whether implemented manually or using device management software. There is a need for more granular control and seamlessly-implemented camera restrictions that allow use of the camera in enterprise settings.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to augmented reality based image protection in enterprise settings. Managing cameras in an enterprise setting can present difficulties. For example, most mobile phones are equipped with cameras, so employee phone usage can be restricted. Existing technologies can impose blanket restrictions on camera usage. These restrictions are not foolproof, and can also lead to employee disillusionment or dissatisfaction. Smartphones can be central to a person's lifestyle. In addition, many enterprises can utilize mobile phone cameras for enterprise workflows and activities. As a result, blanket restrictions can be undesirable whether implemented manually or using device management software. However, the present disclosure describes mechanisms that enable an enterprise to enable seamless and secure camera usage in an enterprise setting by providing augmented reality based image protection rather than blanket restrictions.

Augmented reality can allow a client device to overlay digital images on top of views of the real world. The present disclosure includes processes that can bring enterprise information into the physical world by enabling actions based on enterprise user permissions and the locations, objects, and devices in the physical environment. Information about the physical environment, locations, objects, and devices can be overlaid using the client device. In an enterprise environment, information technology (IT) administrators can use a management service to implement image protections. The image protections can use a management service integrated augmented reality camera application to prevent unauthorized and unprotected capture of images that include confidential or otherwise protected objects 114 in an enterprise environment. The protected objects 114 can include any object that includes or shows protected character strings that are defined as confidential or protected. A management service integrated viewer application can prevent unauthorized viewing of images that include confidential or otherwise protected objects 114 in an enterprise environment.

Figure 1:
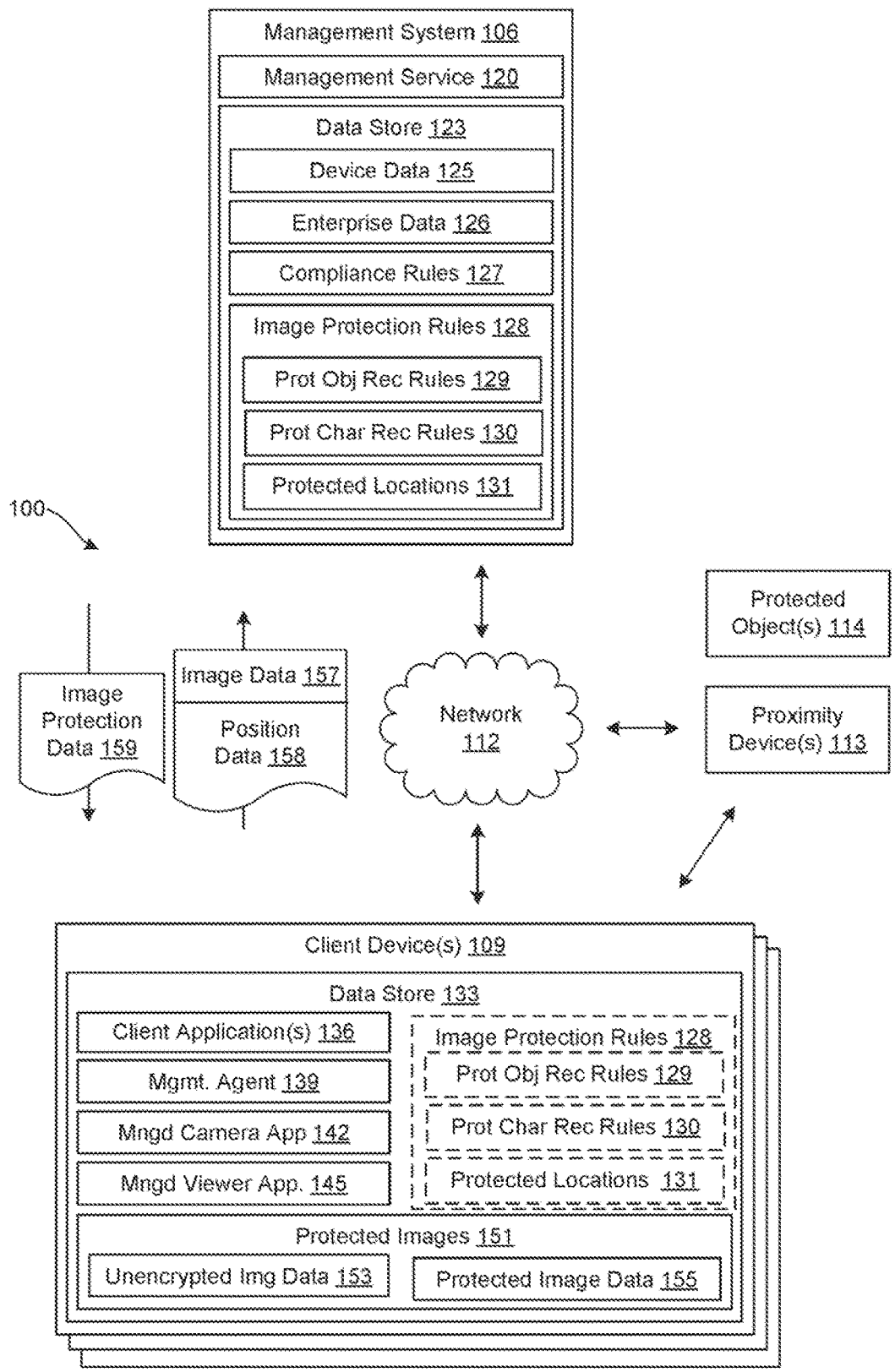
FIG. 1 is a drawing of an example of a networked environment including components that provide augmented reality based image protection in enterprise settings.

With reference to FIG. 1, shown is an example of a networked environment 100. The networked environment 100 can include a management system 106, a client device 109, a proximity device 113, and other components in communication with one another over a network 112. The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 106 can include a server computer or any other system providing computing capability. While referred to in the singular, the management system 106 can include a plurality of computing devices that are arranged in one or more server banks, computer banks, or other arrangements. The management system 106 can include a grid computing resource or any other distributed computing arrangement. The management system 106 can be customer or enterprise-specific. In some embodiments, the management system can be part of a local network and can be local to at least one of the other components of the networked environment, for example, as shown in FIG. 1. In other embodiments, the management system 106 can be remote from the other components, or the computing devices of the management system 106 can be located in a single installation or can be distributed among many different geographical locations local and/or remote from the other components. The management system 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The components executed on the management system 106 can include a management service 120 as well as other applications, services, processes, systems, engines, or functionality not discussed in detail herein. The management service 120 can be stored in the data store 123 of the management system 106. The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory. The data store 123 can include memory of the management system 106, mass storage resources of the management system 106, or any other storage resources on which data can be stored by the management system 106.

The data stored in the data store 123 can include, for example, management data including device data 125, enterprise data 126, compliance rules 127, and image protection rules 128, as well as other data. The data stored in the data store 123 can be associated with the operation of the various applications and/or functional entities described. Client devices 109, proximity devices 113, and protected objects 114 (including objects that are detected to show protected character strings) can be identified within the device data 125 by one or more of a device identifier, a unique device identifier (UDID), a media access control (MAC) address, an internet protocol (IP) address, or another globally unique identifier that uniquely identifies a device or protected object 114 with respect to other protected objects 114 that are managed and tracked by the management service 120.

Device data 125 can include data associated with a configuration of each client device 109 and can include an identifier of the client device 109. The identifier can be a serial number, media access control (MAC) address, other network address, or another device identifier. In addition, the device data 125 can include an enrollment status indicating whether each client device 109 is enrolled with or managed by the management service 120. A client device 109 designated as "enrolled" can be permitted to access the enterprise data 126, while a client device 109 designated as "not enrolled," or having no designation, can be denied access to the enterprise data 126 including protected image data 155.

Device data 125 can include credentials associated with user accounts of the management service 120 that enable or permit communications with the management service 120. Similarly, gateway credentials can be credentials associated with gateway accounts and can enable or permit communications with the management service 120. The credentials are provided for authentication with the management service 120 for management operations. In some situations, gateway credentials are not provided to or exposed to any user during the enrollment process. The credentials can include one or more of a username, a password, an HMAC token, and/or a certificate, for authentication.

Additionally, device data 125 can include indications of the state of devices including the client devices 109. For instance, these indications can specify applications that are installed on the client devices 109, configurations or settings that are applied to each of the devices, user accounts, gateway accounts, or service accounts associated with each of the devices, the physical locations of each of the devices, the network to which each of the devices is connected, and other information describing the current state of each of the devices. While a user account can be associated with a particular person, in some cases a user account can be unassociated with any particular person, and can nevertheless be utilized for client devices 109 that provide certain functionalities, such as automatic functionalities.

Device data 125 can also include data pertaining to organizational groups. An administrator can specify one or more of the client devices 109 as belonging to an organizational group. The organizational group can refer to a group of user accounts, which can be associated with the client devices 109. However, the organizational group can also indicate protected objects 114 and protected character strings as belonging to a particular organizational group or department. Any physical object that includes a protected character string in an enterprise environment can be considered a protected object 114, including permanent lettering as well as displays or screens that are showing the protected character string. Organizational groups can be created by an administrator of the management service 120 such that a batch of client devices 109 can be configured and assigned permissions according to common settings. For instance, an enterprise can create an organizational group for the marketing department and another for the sales department, where client devices 109 in the marketing department are configured and provided permissions differently from the client devices 109 in the sales department. Device data 125 can include data associated with a gateway account or user account. User accounts can also be assigned organizational subgroups. Some organizational subgroups can be assigned different permissions than the general permissions of the organizational group. User accounts can also associated with an enterprise role. In some cases, a role can refer to the organizational group and subgroup of a user account. In other cases, the enterprise role can be defined in addition to the organizational group and subgroup.

Compliance rules 127 can include, for example, configurable criteria that must be satisfied for an enrolled one of the client devices 109 to be in compliance with the management service 120. The compliance rules 127 can be based on a number of factors, including geographical location, activation status, enrollment status, and authentication data including authentication data obtained by a device registration system, time, and date, and network properties, among other factors associated with each device. The compliance rules 127 can also be determined based on a user account associated with a user.

Compliance rules 127 can include predefined constraints that must be met in order for the management service 120, or other applications, to permit access to the enterprise data 126. The management service 120 can communicate with the management agent 139, or other applications to determine whether states exist on the client device 109 that do not satisfy one or more compliance rules 127. States can include, for example, a virus or malware being detected on the device; installation or execution of a blacklisted application; a device being "rooted" or "jailbroken," where root access is provided to a user of the device. Additional states can include the presence of particular files, questionable device configurations, vulnerable versions of applications, vulnerable states of devices or other vulnerability, as can be appreciated.

Image protection rules 128 can include rules for protecting protected objects 114 in the enterprise environment. The image protection rules 128 can specify compliance rules 127 to enable usage of the managed camera application 142 and viewing protected image areas of a protected image. The image protection rules 128 can also specify protection types and protection levels for protected objects 114 and protected characters, character strings, and sysmbols. The image protection rules 128 can include permissions to view protected images or protected image areas that depict protected objects 114 and protected character strings. The permissions can map specific user accounts, enterprise roles, organizational groups, and organizational subgroups to permit or deny viewing protected images or protected image areas associated with one or more protection types and protection levels, based on the protected objects 114 and character strings depicted on objects.

Image protection rules 128 can also include protected object recognition rules 129 and protected character recognition rules 130. The protected object recognition rules 129 can include object recognition instructions such as machine learning object recognition code that is trained to identify protected objects 114 that are defined as protected or confidential within the management service 120 according to an enterprise administrator. For example, the management service 120 can generate a user interface through which a user can upload or provide network locations or uniform resource links (URLs) for images, three dimensional models, and trained object recognition models for a protected object. The images can include images that are labelled with particular views and orientations relative to each other such as a top view, a bottom view, and lateral or side views including a front view, a back view, and so on. Three dimensional models can be provided, such as a computer aided design (CAD) models including solid three dimensional models, wireframe three dimensional models, and surface three dimensional models.

The management service 120 can train a recognition model of the protected object recognition rules 129 to identify the protected object 114 using one or more of the provided images and three dimensional models and a verification data set. Manual verification can also be used. The management service 120 can also receive pre-trained object recognition models that are uploaded or linked using a network location.

Image protection rules 128 can also include protected character recognition rules 130. The protected character recognition rules 130 can include user-defined characters and character strings that can be detected in an image. The characters can include machine-readable symbols like quick response (QR) codes, bar codes, and others. The protected character recognition rules 130 can include rules that enable optical character recognition that can include perspective recognition so that the characters can be recognized on flat and curved surfaces, and surfaces that are at angles (i.e., non-parallel), with the camera device of the client device 109. The management service 120 can include a console user interface through which a user can define protected character strings to include in the protected character recognition rules 130.

The management service 120 can include a console user interface through which a user can define permissions to view protected objects 114 and objects that include a particular protected character or character string. The image protection rules 128 can include the permissions. Permissions can include enterprise role-based permissions. The enterprise role can refer to a role associated with a user account with the management service 120. The enterprise role can refer to a position or occupation with the enterprise, such as administrator, manager, developer, scientist, janitor, student, professor, researcher, and so on. Each enterprise role can be assigned permissions to capture and view protected objects 114 and protected character strings corresponding to one or more protection type or protection level.

The management service 120 can oversee the management of devices including the client devices 109. The management service 120 can oversee the operation of the devices enrolled with the management service 120 as well as manage enrollment and un-enrollment operations for the devices. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein.

The management service 120 can transmit various software components to the client device 109 which can be installed, configured, implemented and enforced by the management agent 139. Such software components can include, for example, additional client applications 136, resources, libraries, drivers, device configurations, or other similar components that require installation on the client device 109 as specified by an administrator of the management service 120. The management service 120 can further cause compliance rules 127 to be implemented on a managed and enrolled client device 109. Compliance rules 127 can include, for example, restrictions or permissions pertaining to capabilities of a client device 109. The compliance rules 127 can specify that hardware or software functions of the client device 109 are to be enabled or be disabled during a certain time period or when the client device 109 is physically located at a particular location.

The management service 120 can place at least one command to implement compliance rules 127 in a command queue of the client device 109. The client device 109 can check in with the management service 120, retrieve the command from the command queue provided by the management service 120, and implement the command using the management agent 139.

The management agent 139 can retrieve compliance rules 127 that disable or blacklist native camera applications 136 and third party camera applications 136 when the client device 109 is identified to be in a protected location 131 such as a protected indoor area defined by the management service 120. The compliance rules 127 can also include rules and commands to install, enable, and whitelist, the managed camera application 142. In other words, the compliance rules 127 can enforce usage of the managed camera application 142 when the client device 109 is within a predefined area or areas corresponding to protected locations 131. The management service 120, the management agent 139, the managed camera application 142, and the managed viewer application 145 can identify, based on position data 158 of the client device 109, that the device is in a protected location 131. In some examples, the managed camera application 142, and the managed viewer application 145 can be components of the management agent 139, and in other cases, they can include standalone or separate applications.

The management service 120 can include a console user interface through which a user can define protected locations 131 for an enterprise, including indoor locations where protected objects 114 and protected character devices are likely to be found. The protected locations 131 can be defined using global positioning service (GPS) location data and other information including one or more indoor positioning system (IPS) technologies. The IPS technologies can include WiFi position data 158, Bluetooth low energy (BLE) beacon position data, Visual Positioning System (VPS) position data, LiFi and other visual or visible light communication (VLC) position data. GPS can also be used in addition to IPS technologies to define and identify an indoor position.

The IPS technologies can be used in order to more accurately define a position of protected locations 131, and to detect the position of the client devices 109. Enterprises can include multiple-level (e.g., multiple-story) and underground structures where traditional GPS technologies can lack accuracy or fail. An indoor protected location 131 can nevertheless be defined, and an indoor position of the client device 109 can be detected using an IPS utilized by the management service 120 and the managed camera application 142.

In some cases, the IPS can define or identify a location using distance measurements to nearby anchor nodes with known fixed positions. Anchor nodes can include WiFi, Bluetooth, BLE, VPS, VLC, LiFi, and other types of proximity devices 113. The IPS can utilize proximity devices that are placed for position detection purposes as well as proximity devices that are placed in association with a protected object 114. Multiple types of devices can be used concurrently using the various IPS technologies. Further, the known locations for protected objects 114 and protected character strings or text can also be defined using GPS position data 158, and IPS technologies.

The protected locations 131 and locations for protected objects 114, including objects that show protected character strings, can be compared to the position data 158 for the client device 109. The client device 109 can include capability to use GPS as well as the IPS technologies such as WiFi, Bluetooth, BLE, VPS, LiFi, VLC and others. These technologies can identify an indoor location of the client device 109. The client device 109 can also identify an orientation including azimuthal angle and elevation angle using accelerometer, gyroscope, and compass orientation data using corresponding devices of the client device 109.

These technologies can be used individually and in combination to identify the indoor position data 158 for the client device 109, which includes location and orientation of the client device 109. The position data 158 for the protected objects 114 and the client device 109 can be analyzed by the management service 120, the managed camera application 142, and the management agent 139, to determine whether the client device 109 is in a protection location, whether the client device 109 is facing a protected object 114 or known location of a protected character string.

The management service 120 can also request that the client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the client device 109 check-in with the management service 120. The notification service can push or otherwise route a notification to the client device 109. Once the notification is received, the management agent 139 can cause the client device 109 to check-in with the management service 120. The management agent 139 can retrieve any commands from the command queue.

A proximity device 113 can be associated with a protected object 114. Protected objects 114 can include managed devices like the client device 109, as well as rooms, fields, paintings, machinery, and other protected objects 114 in the enterprise environment. Protected objects 114 can be items that an enterprise defines as confidential or protected. A proximity device 113 can generate a beacon or another signal that can be detected by the client device 109 and identified by the managed camera application 142. For example, the proximity device 113 can include a Bluetooth or BLE device, which can generate a Bluetooth beacon. The beacon can include a universally unique identifier of the proximity device 113 itself or a protected object 114 that is managed by the management service 120. The proximity device 113 or the protected object 114 can be associated with a protection level as discussed. As a result, the managed camera application 142 can accurately identify the protected object 114 and proximity to the protected object 114. This information can be transmitted as position data 158, enabling the management service 120 to identify the protected object 114 and the proximity to the protected object 114.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 133 that also includes client applications 136, a management agent 139, a managed camera application 142, a managed viewer application 145, and protected images 151. Protected images 151 can include unencrypted image data 153 and protected image data 155.

The client device 109 can also be equipped with networking capability or networking interfaces, including a localized networking or communication capability, such as a near-field communication (NFC) capability, radio-frequency identification (RFID) read or write capability, Bluetooth communication capability, GPS capability, WiFi communication capability, VPS position capability, LiFi capability and VLC position capability, accelerometer capability, gyroscope capability, compass capability, camera or image detection capability, and other localized communication, location, and orientation detection capabilities. In some embodiments, the client device 109 is mobile where the client device 109 is easily portable from one location to another, such as a smart phone, tablet, or laptop computer. The client device 109 can include a display, such as a liquid crystal display (LCD), organic light emitting diode (OLED) display, touch-screen display, or other type of display device.

To this end, some client applications 136 can include a browser or a dedicated application, and a user interface can include a network page, an application screen, or other interface. The client device 109 can also access web applications using the browser application. Further, other client applications 136 can include device management agents, enterprise applications, social networking applications, word processors, spreadsheet applications, media player applications, or other applications. The management agent 139 can perform actions as directed by the management service 120, for instance, by checking in with the management service 120, retrieving a command from the command queue, and implementing the command as discussed above.

The managed camera application 142 can include augmented reality (AR) capabilities and can be considered a managed AR camera application 142. The managed camera application 142 can work in conjunction with a camera device of the client device 109, as well as all integrated or connected devices that provide localized communication, location, and orientation detection capabilities. For example, the managed camera application 142 can render an AR camera user interface that includes images, video, and other image data in a view of the physical world that can update constantly or periodically on a display of the client device 109. The managed camera application 142 can also generate protected object 114 areas or protected image areas or sectors within the image. The protected image areas can include areas that are identified, by the managed camera application 142 or the management service 120, to include protected objects 114, including protected objects 114 that are protected based on showing a protected character string. The managed camera application 142 and the management service 120 can use the image protection rules 128 and the position location data for the client device 109 to identify a subset of the image that shows a protected image area. To this end, the client device 109 can include image protection rules 128. Alternatively, the managed camera application 142 can transmit image data 157 and position data 158 to the management service 120. The management service 120 can analyze this information and return image protection data 159, such as an indication of the protected image areas within an image, or a protected image 151 generated using this information.

The managed camera application 142 can use AR technologies to block out the protected image areas using overlays in a live camera view, as the client device 109 is repositioned. In some cases, the protected image areas can be obscured in the live camera view of the managed camera application 142. This can provide a preview of what the captured protected image 151 will look like (e.g., what the protected image 151 will look like if the viewing user does not have sufficient permissions to view the protected image area). The protected image areas can be shown to include a protection level, protection type, role, organizational group, or subgroup that is required in order to either capture the image as an unmodified image and/or view the protected locations 131 once captured as a protected image 151. In other examples, the managed camera application 142 can disable capture of any image until the protected image areas are no longer in the image, at which point the capture user interface element can be enabled, and an unmodified image can be captured.

The managed camera application 142 can use AR technologies to provide a user interface overlay that directs a user a specific direction to reposition the camera to avoid or reduce the amount of protected image areas that are in the field of view. The repositioning direction can be identified as the direction corresponding to a minimum repositioning or change of angle, such as an azimuthal angle, an elevation angle, or angle that affects azimuth and elevation. The various operation types of the managed camera application 142 can correspond to administratively defined options that are enforced as compliance rules 127, or as user selected modes of operation if multiple modes are allowed according to the compliance rules.

In the various embodiments, the managed camera application 142 can identify protected objects 114 are depicted in the user interface of the managed camera application 142 or are in a field of view of the client device 109. In some cases, the managed camera application 142 can utilize position data 158 for the client device 109 and known location data for protected objects 114 to identify whether the client device 109 is facing a protected object 114. The managed camera application 142 can also determine a protected image area based on the position data 158 for the client device 109 and known location data for protected objects 114.

In other cases, the managed camera application 142 can identify that the client device 109 is in a protected location 131 such as an indoor room or outdoor field, and can then use image analysis to identify protected objects in the field of view of the camera of the client device 109. The image analysis can include analysis according to the protected object recognition rules 129 to identify protected objects 114 based on images and three dimensional models. The image analysis can also include analysis according to the protected character recognition rules 130 to identify protected objects 114 that depict a protected character string.

Position data 158 for the client device 109 can include a location of the client device 109 and an orientation of the client device 109 in order to determine that a protected object 114 is in a field of view of the client device 109. The location of the client device 109 can be determined using GPS, WiFi, VPS, LiFi, VLC, or a combination of techniques. The orientation of the client device 109 can be determined using accelerometer, gyroscope, magnetometer, compass, camera, and orientation detection devices of the client device 109.

An azimuthal angle can be determined for the client device 109. An azimuthal angle can include a measurement in a coordinate system such as a spherical coordinate system, horizontal coordinate system, or another coordinate system. The orientation of the client device 109 can be calculated using a vector that indicates a direction the client device 109 or the direction a camera of the client device 109 is pointing. The azimuthal angle can be an angle between the vector or a horizontal component of the vector, and a horizontal reference vector in a horizontal plane. The azimuthal angle can indicate a horizontal angle at which the client device is pointing in the horizontal plane with reference to the horizontal reference vector. In some cases, the orientation of the client device 109 can also calculate an elevation angle or altitude angle of the client device 109. The elevation angle can be an angle between the vector and the horizontal plane. The elevation angle can indicate an angle at which the client device 109 is pointing up or down vertically with the angle making reference to the horizontal plane.

The managed camera application 142 can also communicate with the management service 120 in order to determine protected objects 114 that are in the field of view of the camera of the client device 109. In some cases, the managed camera application 142 can transmit the image data along with position data 158 of the client device 109 to the management service. The management service 120 can identify a protected object 114 or device in the field of view of the client device 109. The management service 120 can return image protection data 159 that identifies protected image areas. The bounds, perimeter, or area of the protected image areas can be defined using image coordinates of an image coordinate system, polygons defined in the image coordinate system, image pixels, or another manner. In some modes of operation, the managed camera application 142 can use the image protection data 159 to provide on-screen AR objects that obscure or specify the protected locations 131. The managed camera application 142 can also use the image protection data 159 to indicate a direction to reposition the camera to eliminate or minimize the protected image areas from the field of view of the camera. In some examples, a user interface element can indicate that the image is prepared for capture, and the image capture user interface element can be enabled.

The managed camera application 142 can also generate a protected image 151. A protected image 151 can include one or more files or data structures that include unencrypted image data 153. In some examples, the protected image 151 can also include protected image data 155. The unencrypted image data 153 can include an image that includes at least one obscured protected image area. The obscured protected image areas can be stored such that the protected images areas are replaced with a replacement area with a single color such as black, white, green, red, gray, or another color. The color can be selected as the average, mean, or mode of colors in the protected image area, according to user preference, or in another manner. In other cases, the obscured protected image areas can be stored such that the protected images areas are replaced with a processed version of the protected image areas, such as a gaussian blurred replacement area. The unencrypted image data 153 can be viewed using a standard image viewing application, using the managed viewer application 145, or through a user interface of the management service 120. The unencrypted image data 153 can include an image file in any image format. The unencrypted image data 153 can be accessed by any user with any permissions or no permissions can view the unencrypted image data 153. Even if no encrypted or protected image data 155 is included in the protected image 151, the unencrypted image data 153 can be considered protected since the protected image areas are replaced and unrecoverable using the unencrypted image data 153 alone.

The protected image data 155 can include an encrypted version of a protected image area that is encrypted using a predetermined cipher or key. Asymmetrical or symmetrical encryption can be used. The protected image data 155 can be included in the protected image 151 so that the managed viewer application 145 and the management service 120 can enforce permissions according to the image protection rules 128. For example, the managed viewer application 145 can determine that a user is authorized to view a protected image area, decrypt the encrypted protected image area, and regenerate the protected image 151 to include the originally captured and unedited protected image area.

The protected image data 155 can alternatively include location, orientation, and other position data 158 for the client device 109 at capture time. This can enable the management service 120 or the managed viewer application 145 to reproduce or regenerate the protected locations 131 of an image based on previously collected images taken from a similar position and stored in the data store 123. In some examples, the protected image data 155 can be stenographically embedded in the protected image 151.

The protected image 151 can be transmitted to another client device 109 for viewing using any viewing application for unencrypted image data 153 portions. However, the managed viewer application 145 can reproduce the image including the protected image areas. In some cases, multiple encrypted areas can be encrypted so that the managed viewer application 145 can reproduce certain protected image areas for users with permissions to view a first protection level or type, while other protected image areas remain that can be reproduced for other users with a second protection level or type. The managed viewer application 145 can also include a user interface element that when selected, requests administrative approval to unlock or unencrypt the protected image areas for which they lack permissions. When selected, the managed viewer application 145 can transmit a notification to a client device 109 of an administrative user, or to the management service 120. The management service 120 can generate the notification in a console user interface of the management service 120, identify administrative approval or disproval, and return an approval status that indicates the administrative approval or disproval. The managed viewer application 145 can unlock or unencrypt the protected image areas if approval is indicated.

The management service 120 can also generate the protected image 151 in response to a request to generate the protected image 151 using image data 157 and position data 158. In some cases, the management service 120 can return the protected image 151 or a link to view the protected image in a managed viewer application 145, or in a web application or other user interface provided by the management service 120.

Figure 2:
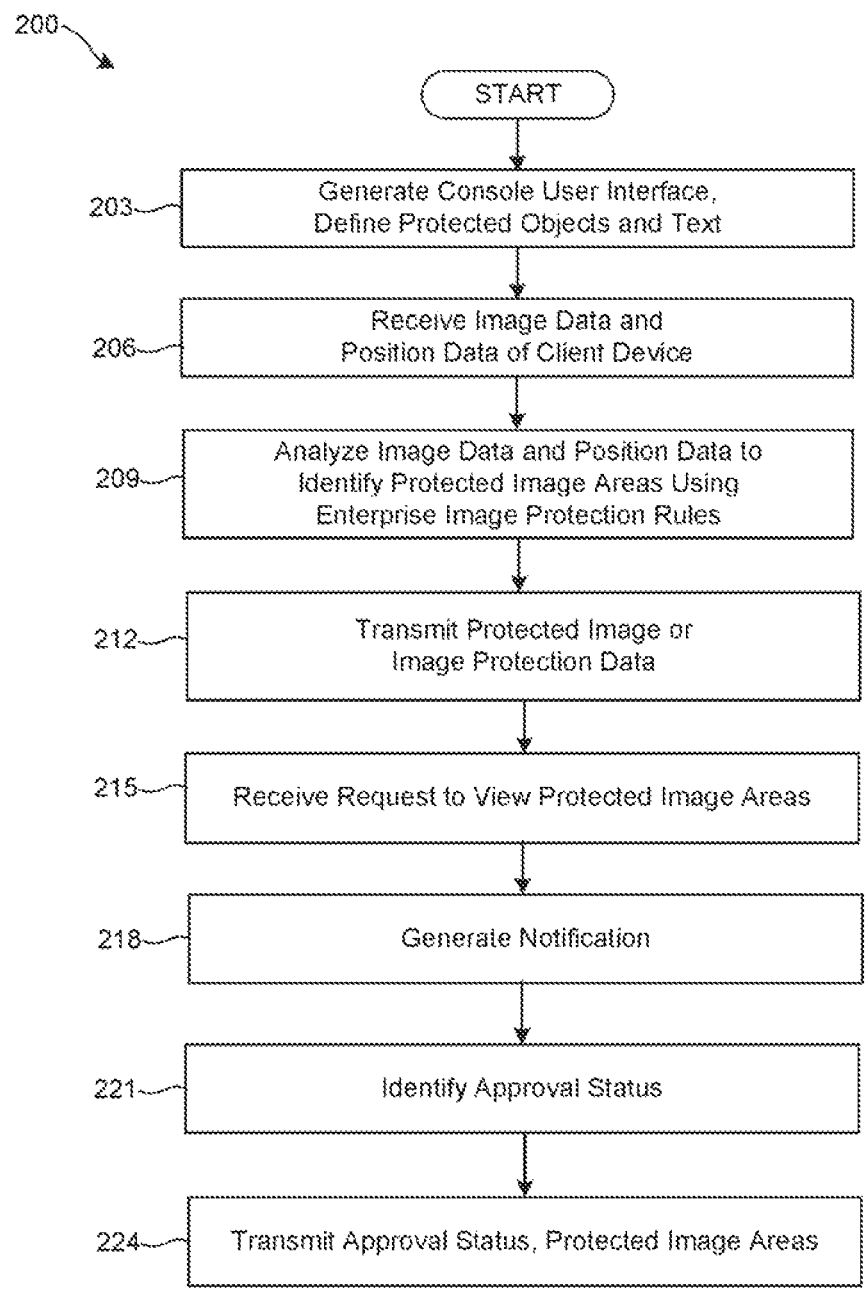
FIG. 2 is a flowchart illustrating an example of functionalities implemented by components of the networked environment for augmented reality based image protection.

FIG. 2 shows a flowchart 200 that illustrates functionality performed by components of the networked environment 100. While the actions are discussed with respect to the management service 120, certain aspects are performed by other components of the networked environment.

In step 203, the management service 120 can generate a console user interface to define protected locations 131, protected objects 114, and protected text or character strings. The protected locations 131 can be defined using one or more of GPS location data, WiFi position data, BLE beacon position data, VPS position data, LiFi position data, and VLC position data. This can include associating a protected location 131 with one or more proximity devices 113. Known locations for protected objects 114 and character strings can also be defined. Protected objects 114 and character strings can also be associated with a nearby or specifically-assigned and located proximity device 113.

In order to identify unknown or undefined protected objects 114 and character strings, the console user interface of the management service 120 can further include user interface elements to define protected object recognition rules 129 and protected character recognition rules 130. The protected object recognition rules 129 and protected character recognition rules 130 can include rules that are used in conjunction with image analysis techniques including optical character recognition to identify protected objects 114 and character strings using image data 157 and position data 158 captured and collected using the client device 109.

The management service 120 can generate a user interface through which a user can upload or provide network locations or uniform resource links (URLs) for images, three dimensional models, and trained object recognition models for a protected object. The management service 120 can train a recognition model of the protected object recognition rules 129 to identify the protected object 114. The management service 120 can also receive pre-trained object recognition models that are uploaded or linked using a network location. The management service 120 can include a console user interface through which a user can define protected character strings to include in the protected character recognition rules 130.

In step 206, the management service 120 can receive image data 157 and position data 158 of the client device. In some cases, the image data 157 and position data 158 can be received as a request to identify protected objects 114 and protected image areas. For example, the managed camera application 142 can transmit the request so it can generate a live AR based camera user interface. In other examples, the management service 120 can receive image data 157 and position data 158 as part of a request to generate and return a protected image 151.

In step 209, the management service 120 can analyze the image data 157 and position data 158 to identify protected image areas. The management service 120 can analyze the image data 157 and position data 158 according to the image protection rules 128 that are defined for the enterprise. The management service 120 can use the image data 157, and in some examples the position data 158, as inputs to the protected object recognition rules 129 to generate outputs that indicate protected image areas that depict protected objects 114 in a portion of an image. The management service 120 can use the image data 157, and in some examples the position data 158, as inputs to the protected character recognition rules 130 to generate outputs that indicate protected image areas that depict protected character strings in a portion of the image.

In some examples, the management service 120 can generate a protected image 151 that protects the protected image areas as described. For example, the protected image 151 can include unencrypted image data 153 that obscures protected image areas. The protected image 151 can also include protected image data 155. The protected image data 155 can include encrypted image data corresponding to a protected version of the protected image areas, along with an associated protection type or level for each protected image area. Alternatively, the protected image data 155 can include position data 158 and other information that can be used to simulate or regenerate the protected image area based on previously captured and stored images stored in the data store 123.

In step 212, the management service 120 can transmit the protected image 151 or image protection data 159 to the client device 109. The managed camera application 142 can receive the image protection data 159, including a specification of protected image areas that depict protected character strings in a portion of the image. The managed camera application 142 can use the information to generate an AR based camera user interface. The AR based camera user interface can also generate a protected image 151 using the information received from the management service 120. The protected image 151 can be transmitted to another user of another client device 109.

In step 215, the management service 120 can receive a request to view protected image areas of a protected image 151. A managed viewer application 145 executed on a client device 109 can transmit the request. In some cases, the management service 120 can automatically respond, such as situations where the managed viewer application 145 is confirming that it includes up-to-date the permissions, role, organizational group and subgroups for a user account of a user logged into the client device 109.

In step 218, the management service 120 can generate a notification of the request to view protected image areas of the protected image 151. The notification can be generated and transmitted as a notification message to a client device 109 of an administrative or other user that has authority to approve or disapprove the request. The notification can also be generated as an update to a console user interface that is accessible to the administrative user. The notification and notification message can identify a protected location 131 associated with the protected image areas, a particular protected object 114, and any protected character strings or text that is depicted in the protected image 151. In some cases, the notification and notification message can include the protected image 151. Since the administrative user can have authority to view the protected image areas, the protected image 151 included in the notification can show, or enable the administrative user to reveal, the decrypted protected image areas as originally captured. The notification message can also include a link to view the notification within the console user interface of the management service 120.

In step 221, the management service 120 can identify an approval status for the request to view protected image areas of the protected image 151. The approval status can indicate approval or disapproval of the request. For example, the management service 120 can identify that the administrative user has selected a user interface element through the console user interface that indicates administrative approval or disapproval of the request.

In step 224, the management service 120 can transmit the approval status to the managed viewer application 145. In some examples the management service 120 can also transmit protected image areas to the managed viewer application 145. The protected image areas transmitted can include the protected image areas as originally captured or can include reproduced protected image areas that are reproduced based on the location of the protected image. In some cases, the request to view protected image areas can include position data 158 including location and orientation data for the client device 109, and the unencrypted image data 153. The management service 120 can regenerate, based on a history of images captured and stored in the data store 123, or the protected image areas.

In other examples, the originally captured protected image areas can be identified based on a globally unique image identifier of the protected image 151. The globally unique identifier can be unique among other images taken by all client devices 109 of the enterprise. In some cases, the managed camera application 142 can generate the unique image identifier, and in other examples, the managed camera application 142 can request a unique image identifier from the management service 120. The managed camera application 142 can transmit all images captured to the management service 120. These can include protected images 151 and images that are captured and unprotected (for example, those without any protected image areas).

Each protected image 151 can be stored by the management service 120 in the data store 123 in association with a unique image identifier. In some examples, the protected image data 155 is stored on the management service 120 and only provided to the managed viewer application 145 for temporary viewing. In this scenario, the client device 109 can prevent or disable screenshotting of the managed viewer application 145, or generally for the client device 109.

Figure 3:
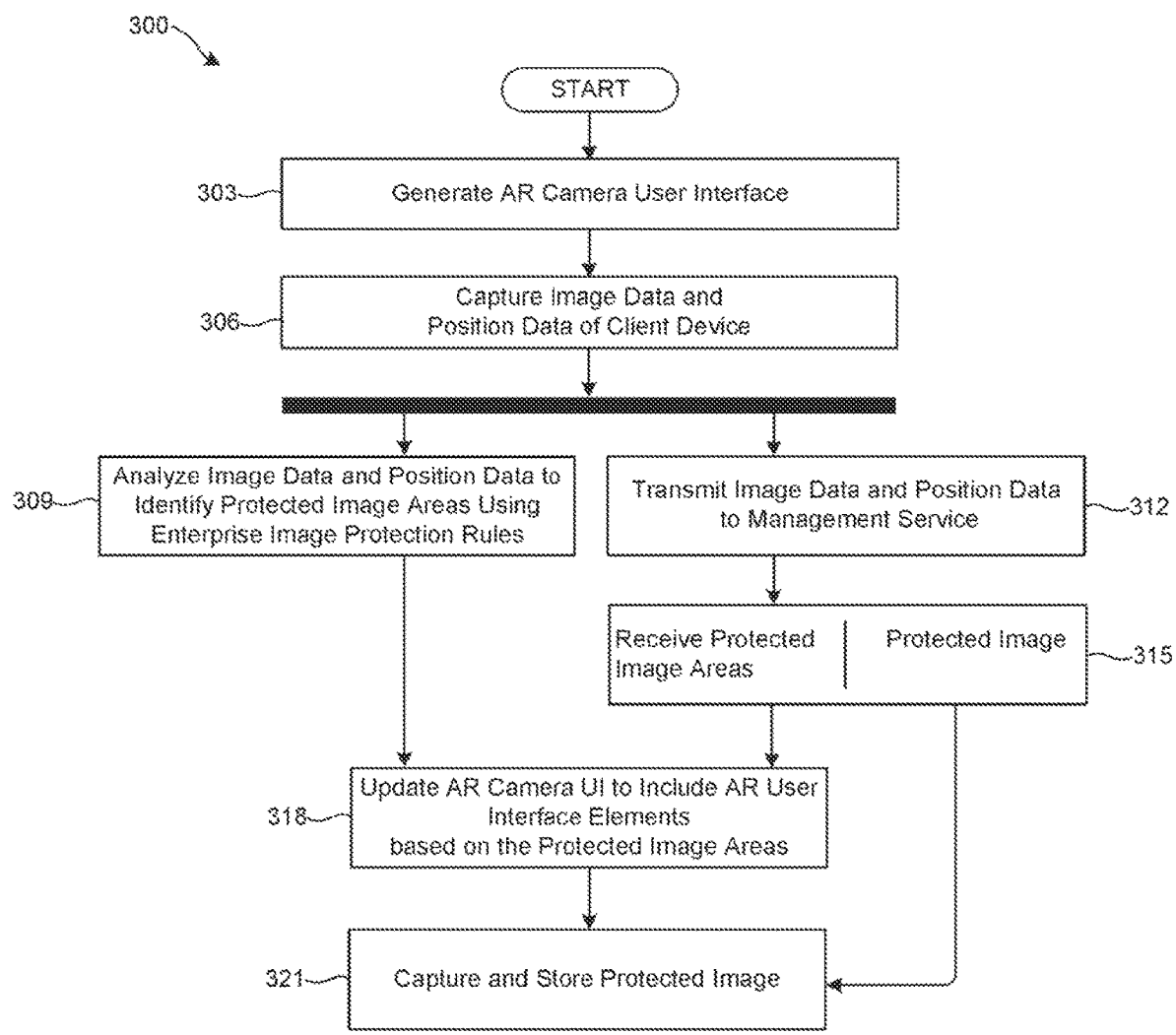
FIG. 3 is a flowchart illustrating another example of functionalities implemented by components of the networked environment for augmented reality based image protection.

FIG. 3 shows a flowchart 300 that illustrates functionality performed by components of the networked environment 100. While the actions are discussed with respect to the managed camera application 142, certain aspects are performed by other components of the networked environment.

In step 303, the managed camera application 142 can generate an AR camera user interface. The AR camera user interface can update constantly or periodically on a display of the client device 109. The managed camera application 142 can generate the AR camera user interface to include a number of overlays or AR user interface elements. The AR user interface elements can be generated relative to a protected image area. For example, to obscure the protected image area, or reduce or eliminate it from view. The managed camera application 142 can be the only camera application that is permitted to be used on the client device 109, according to the compliance rules 127 enforced using the management agent 139. In some examples, the management agent 139 can disable all other camera applications. The management agent 139 can also intercept a request to launch another camera application, such as, a native camera application and instead can launch the managed camera application 142.

In step 306, the managed camera application 142 can capture image data 157 and position data 158 for the client device 109. The AR camera user interface can be generated using a field of view of the camera of the client device 109. In some cases, the managed camera application 142 can include all data and rules required to generate the AR camera user interface, including the image protection rules 128, compliance rules 127, and other information. Some client devices 109 may have insufficient storage or processor capacity to process the image data using the image protection rules 128. Some implementations can rely on the management service 120 for aspects of image processing using the image protection rules 128. Other implementations involve both the managed camera application 142 and the management service 120. While certain aspects of image recognition are discussed as performed by either the managed camera application 142 or the management service 120, the task can be separated such that each performs any predetermined set of the functionalities discussed while the other performs another set of functionalities, among the various embodiments.

In step 309, the managed camera application 142 can analyze image data 157 and position data 158 to identify protected image areas. The managed camera application 142 can analyze the image data 157 and position data 158 according to the image protection rules 128 that are defined for the enterprise. The managed camera application 142 can use the image data 157, and in some examples the position data 158, as inputs to the protected object recognition rules 129 to generate outputs that indicate protected image areas that depict protected objects 114 in a portion of an image. The managed camera application 142 can use the image data 157, and in some examples the position data 158, as inputs to the protected character recognition rules 130 to generate outputs that indicate protected image areas that depict protected character strings in a portion of the image.

In step 312, the managed camera application 142 can transmit image data 157 and position data 158 to the management service 120. In some cases, the image data 157 and position data 158 can be transmitted as a request to identify protected objects 114 and protected image areas. For example, the managed camera application 142 can transmit the request so it can generate the live AR camera user interface. In other examples, the managed camera application 142 can transmit the request as part of a request to generate and return a protected image 151.

In step 315, the managed camera application 142 can receive the protected image 151 or image protection data 159 from the management service 120. The managed camera application 142 can receive the image protection data 159, including a specification of protected image areas that depict protected character strings in a portion of the image.

In step 318, the managed camera application 142 can update the AR camera user interface to include AR user interface elements. The managed camera application 142 can use AR user interface elements as an overlay on the protected image areas in a live camera view as the client device 109 is repositioned. The AR user interface elements can outline or otherwise indicate protected image areas, partially obscure protected image areas, or completely obscure protected image areas in the live camera view of the managed camera application 142. This can provide a preview of what the captured protected image 151 will look like if the viewing user does not have sufficient permissions to view the protected image area. The protected image areas can be shown to include a protection level, protection type, role, organizational group, or subgroup that is required in order to either capture the image as an unmodified image and/or view the protected locations 131 once captured as a protected image 151. In other examples, the managed camera application 142 can disable capture of any image until the protected image areas are no longer in the image, at which point, the capture user interface element can be enabled, and an unmodified image can be captured.

The managed camera application 142 can use AR technologies to provide a user interface overlay that directs a user in a specific direction to reposition the camera to avoid or reduce the amount of protected image areas that are in the field of view. The repositioning direction can be identified as the direction corresponding to a minimum repositioning or change of angle, such as an azimuthal angle, an elevation angle, or angle that affects azimuth and elevation. The various operation types of the managed camera application 142 can correspond to administratively defined options that are enforced as compliance rules 127, or as user selected modes of operation if multiple modes are allowed according to the compliance rules.

In step 321, the managed camera application 142 can capture and store a protected image 151. A user can select an image capture element or a button in the AR camera user interface. The managed camera application 142 can generate a protected image 151 based on the image or view shown at the point of capture. A protected image 151 can include one or more files or data structures that include unencrypted image data 153. In some examples, the protected image 151 can also include protected image data 155.

The unencrypted image data 153 can include an image that includes at least one obscured protected image area. The obscured protected image areas can be stored such that the protected image area is replaced with a replacement area with a particular color, a processed version of the protected image area, or another replacement area. The unencrypted image data 153 can be viewed using a standard image viewing application, using the managed viewer application 145, or through a user interface of the management service 120. Even if no protected image data 155 is included in the protected image 151, the unencrypted image data 153 can be considered protected since the protected image areas are replaced and unrecoverable using the unencrypted image data 153 alone.

The protected image data 155 can include an encrypted version of a protected image area that is encrypted using a predetermined cipher or key. Asymmetrical or symmetrical encryption can be used. The protected image data 155 can be included in the protected image 151 so that the managed viewer application 145 and the management service 120 can enforce permissions according to the image protection rules 128. For example, the managed viewer application 145 can determine that a user is authorized to view a protected image area, decrypt the encrypted protected image area, and regenerate the protected image 151 to include the originally captured and unedited protected image area.

The protected image data 155 can alternatively include location, orientation, and other position data 158 for the client device 109 at capture time. This can enable the management service 120 or the managed viewer application 145 to reproduce or regenerate the protected locations 131 of an image based on previously collected images taken from a similar position and stored in the data store 123. The protected image 151 can be transmitted to another client device 109 for viewing using any viewing application for unencrypted image data 153 portions.

Figure 4:
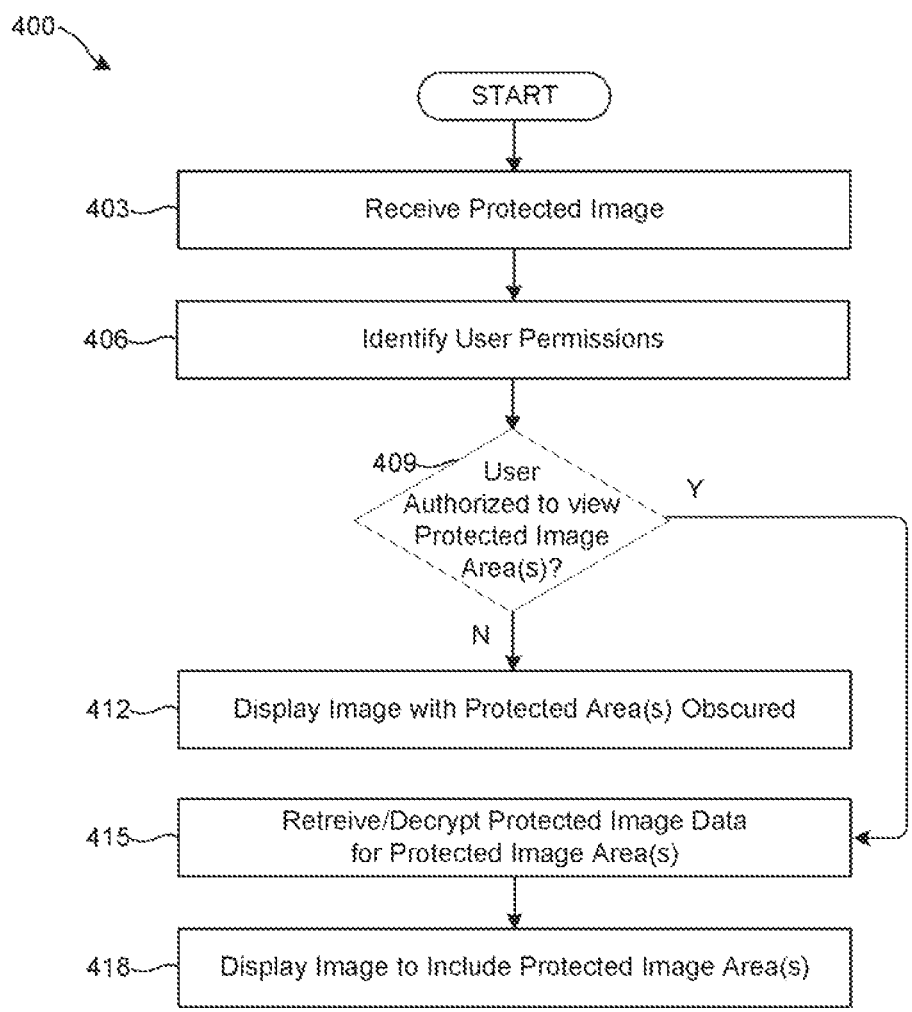
FIG. 4 is a flowchart illustrating another example of functionalities implemented by components of the networked environment for augmented reality based image protection.

FIG. 4 shows a flowchart 400 that illustrates functionality performed by components of the networked environment 100. While the actions are discussed with respect to the managed viewer application 145, certain aspects are performed by other components of the networked environment.

In step 403, the managed viewer application 145 can receive a protected image 151. For example, the client device 109 can receive a protected image 151 through a message and user of the managed viewer application 145 to open the protected image 151. In other cases, the managed viewer application 145 can download or retrieve the protected image 151 from the management service 120. A protected image 151 can be stored in a format that enables any viewer to view the unencrypted image data 153 portion of the protected image 151. However, the protected image data 155 portion of the protected image 151 can be limited to be viewed using the managed viewer application 145. Alternatively, a protected image 151 can be stored in a format that limits the unencrypted image data 153 and the protected image data 155 to be viewed using the managed viewer application 145.

In step 406, the managed viewer application 145 can identify user permissions. The managed viewer application 145 can identify the user permissions stored in a data store 133 of the client device 109. The managed viewer application 145 can identify the user permissions corresponding to organizational group, subgroup, and role associated with a user account logged into the client device 109. The managed viewer application 145 can also identify the user permissions by transmitting a request to the management service 120 and receiving a response that includes the permissions based on organizational group, subgroup, and role associated with a user account logged into the client device 109.

In step 409, the managed viewer application 145 can determine whether a user is authorized to view a protected image area. For example, the user or user account can be authorized to view the protected image area if the organizational group, subgroup, and role of the user account is mapped to a protection level or protection type indicated for a protected image area, according to the permissions, the compliance rules 127, and a compliance status of the client device 109. If the user is authorized to view protected image areas, the process moves to step 415. Otherwise the process moves to step 412.

In step 412, the managed viewer application 145 can display the protected image with the protected areas obscured. For example, the managed viewer application 145 can limit the view to the unencrypted image data 153. In some cases, the managed viewer application 145 can provide a user interface element to request manual approval by an administrator or other user. When selected, the user interface element can transmit a request to view protected image areas. The management service 120 can process the request as indicated in FIG. 2 steps 215-224, and the managed viewer application 145 can enable or prevent viewing of these areas according to the approval status received.

In step 415, the managed viewer application 145 can retrieve and decrypt protected image data 155 for the protected image areas. In some cases, the protected image 151 includes the protected image data 155 as encrypted data. Encrypted protected image data 155 can be stored in the data store 123 of the management service 120 such that the managed viewer application 145 can request and receive this data from the management service 120.

In step 418, the managed viewer application 145 can display the protected image 151 that includes protected image areas. This can include reproduced protected image areas that are generated based on other images, as well as protected image areas unencrypted from protected image data 155. As a result, the managed viewer application 145 can display the protected image 151 that includes protected image areas as originally captured by the client device 109 that captured the original image.

Figure 5A:
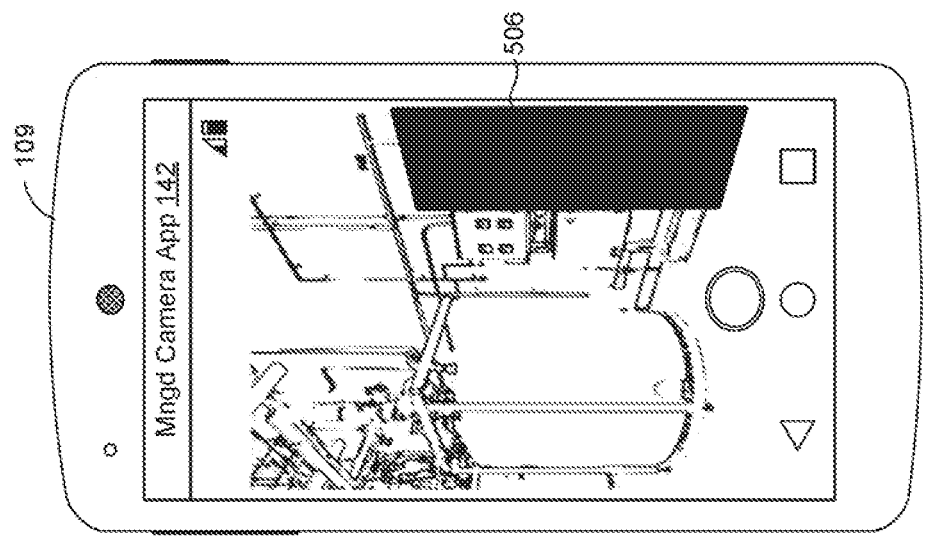
FIGS. 5A and 5B are drawings illustrating an example of functionalities implemented by components of the networked environment and rendered for display on a client device.

FIG. 5A illustrates an example of an AR camera user interface of a managed camera application 142, which is rendered for display on a client device 109. The field of view of the camera of the client device 109 is reproduced along with AR user interface elements. The field of view includes a protected object 114. The protected object 114 can include a particular piece of machinery, an industrial device, a computer device, or any object considered confidential as defined in the image protection rules 128.

In this example, the managed camera application 142 can disable an image capture user interface element 512 until the client device 109 is repositioned to exclude the protected object 114 from the field of view. Once the client device 109 is repositioned, the image capture user interface element 512 can be enabled, and a user of the client device 109 can take a picture. Here, an icon or indicator is provided relative to the image capture user interface element 512 indicating that the image capture is disabled. The image capture user interface element 512 can be removed, hidden, or can have decreased opacity to indicate that the image capture is disabled. Once the protected object 114 is out of the field of view, the indicator icon can change, for example from an X to a check mark or another type of icon, indicating that the image capture is enabled.

The managed camera application 142 can generate a repositioning indicator 509 that indicates a direction to reposition the client device 109 in order to minimize or reduce the amount of protected image area or protected screen area of the protected objects 114 that are in the field of view. In some cases, the repositioning indicator 509 can point in a direction that minimizes the change of angle that eliminates the protected object 114 from the field of view, or a direction that maximizes a decrease of protected image area. Since the image capture user interface element 512 is disabled until no protected objects 114 are in the field of view, the image can be captured and stored as a standard or unprotected image. This embodiment can enable camera usage in a protected location 131 of an enterprise environment without tipping or providing information to a user that indicates which protected objects 114 are in the protected location 131.

The protected object 114 can be identified based on the image protection rules 128, including the protected object recognition rules 129 and the protected character recognition rules 130. For example, the managed camera application 142 can analyze captured image data for the field of view of a camera of the client device 109 according to the protected object recognition rules 129 to identify the protected object 114 based on images or three dimensional models of the protected object 114. The managed camera application 142 can analyze captured image data for the field of view of a camera of the client device 109 according to the protected character recognition rules 130 to identify the protected object 114 based on characters, symbols, or character strings. The managed camera application 142 can recognize letters, numbers, symbols, QR codes 515, as well as other machine-readable optical codes according to the protected character recognition rules 130. In some cases, the character or characters can also be associated with a particular AR user interface element, distance or area relative the character or characters to use as a protected image area, and other information. The character or characters can also be associated with a particular QR code to include in an AR user interface element for inclusion in a protected image 151.

Figure 5B:
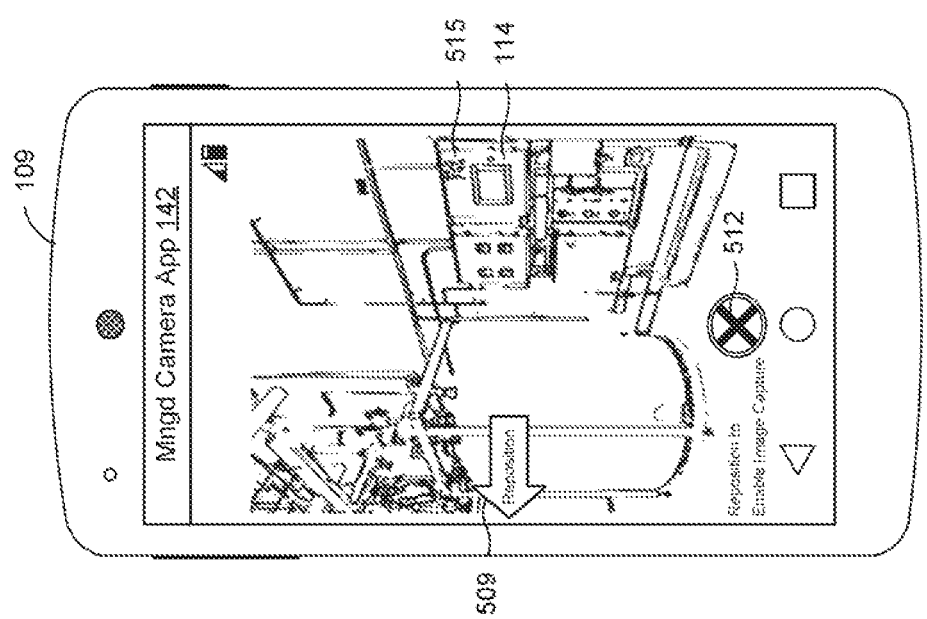

FIG. 5B illustrates another example of an AR camera user interface of a managed camera application 142, which is rendered for display on a client device 109. The field of view of the camera of the client device 109 is reproduced along with AR user interface elements. In this example, the managed camera application 142 can generate an AR object or element 506 that obscures a protected image area. While the field of view includes a protected object 114, the protected object 114 cannot be seen in the image, since the AR object 506 obscures the detected protected image area that depicts the protected object 114.

The image capture user interface element can remain enabled in this example. The view shown in the AR camera user interface of the managed camera application 142 provides a live pre-capture preview of what a captured protected image 151 will look like for a viewer or an account without permissions to view a protection type or level of the protected image area. Some examples can include a selector to select a role, an organizational group, an organizational subgroup, and so on. The managed camera application 142 can provide a live pre-capture preview of what a captured protected image 151 will look like for a viewer corresponding to the selected role, organizational group, or organizational subgroup.

Figure 6A:
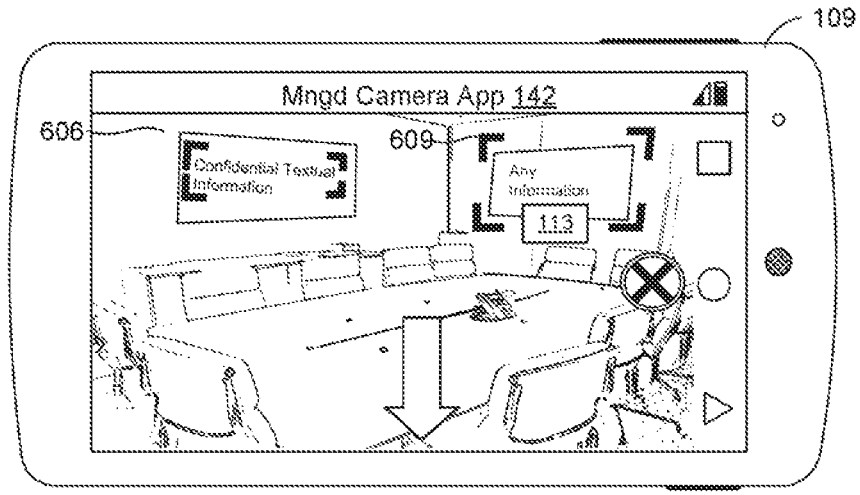
FIGS. 6A and 6B are drawings illustrating another example of functionalities implemented by components of the networked environment and rendered for display on a client device.

FIG. 6A illustrates another example of an AR camera user interface of a managed camera application 142, which is rendered for display on a client device 109. The field of view of the camera of the client device 109 is reproduced along with AR user interface elements. In this example, AR objects 606 and 609 indicate the protected image areas without obscuring them or providing a preview of what a captured protected image 151 will look like.

The AR object 606 can be generated in response to detecting a character, character string, or symbol according to the protected character recognition rules 130. The character string can be written on a whiteboard, blackboard, a display device, or any object. In some examples, only the screen area of the protected character string is designated a protected image area. Alternatively, the managed camera application 142 can identify that the character string is shown on a protected object 114 that corresponds to a whiteboard, blackboard, television, monitor, or another protected object 114 based on image analysis and object detection, and can designate the larger image area of the whole protected object 114 as the protected image area.

The AR object 609 can be generated in response to detecting that the field of view of the client device 109 is facing a proximity device 113 associated with a protected object 114 such as a whiteboard, blackboard, television, monitor, or another protected object 114. In this example, any information that is shown on the protected object 114 can be obscured once the image is captured. The protected image area corresponding to the AR object 609 can be identified using the location of the proximity device 113 relative to the position of the client device 109, as well as image recognition using images or three dimensional models in the protected object recognition rules 129.

The managed camera application 142 can disable an image capture user interface element until the client device 109 is repositioned to exclude the protected object 114 from the field of view. Once the client device 109 is repositioned, the image capture user interface element can be enabled, and a user of the client device 109 can take a picture. The managed camera application 142 can generate a repositioning indicator that indicates a direction to reposition the client device 109 in order to minimize or reduce the amount of protected image area or protected screen area of protected objects 114 in the field of view.

Figure 6B:
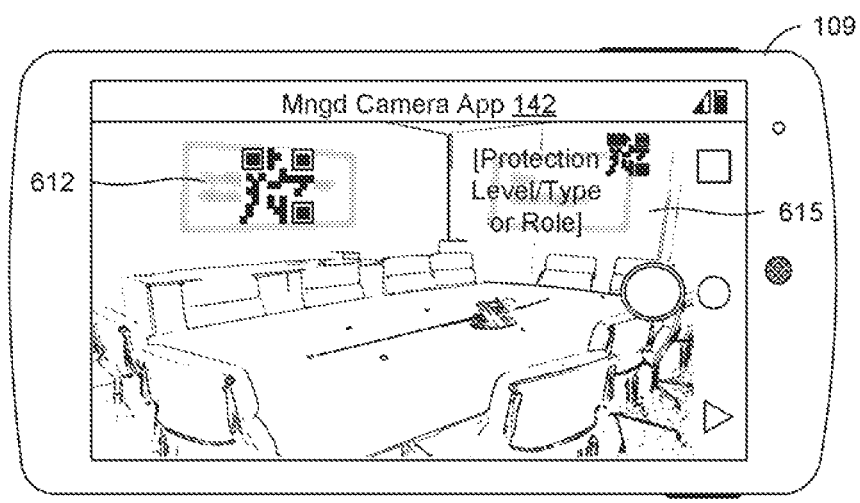

FIG. 6B illustrates another example of an AR camera user interface of a managed camera application 142, which is rendered for display on a client device 109. The field of view of the camera of the client device 109 is reproduced along with AR user interface elements. In this example, AR objects 612 and 615 indicate protected image areas using a processed version of the originally captured protected image areas. The AR objects 612 and 615 can obscure the protected image areas without having a jarring or distracting object in the image. This can provide a preview of what a captured protected image 151 will look like. The AR object 615 can indicate a protection level that is applied to the protected image area based on the obscured protected object 114. The AR object 615 can also indicate a list of one or more roles, organizational groups, or subgroups that can view the protected image area.

The AR objects 612 and 615 can additionally or alternatively include encoded forms of information like QR codes, bar codes, and other machine readable codes and symbols. The QR code can be shown in the AR camera user interface to provide a preview of what the captured protected image 151 will look like. In some cases, a user selection of the QR code or encoded information through the AR camera user interface can provide a preview of, or link to, the information provided through a network location or address associated with the QR code. When viewed through an appropriate application, the machine readable code inserted into the protected image 151 to block the protected object 114 can link further information such as the type of the protected object 114, security or protection level, role, organizational groups, and subgroups needed to view the protected object 114, and additional information.

Figure 7A:
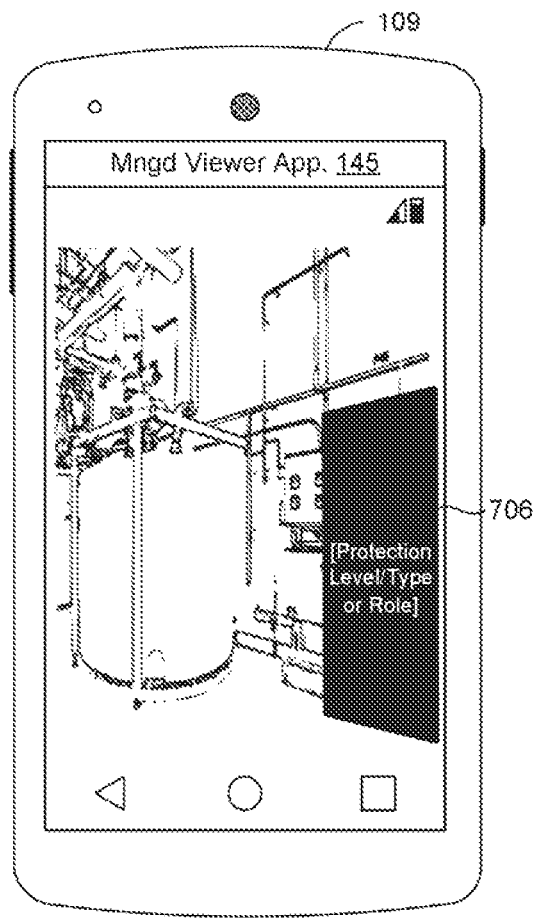
FIGS. 7A and 7B are drawings illustrating another example of functionalities implemented by components of the networked environment and rendered for display on a client device.

FIG. 7A illustrates an example of a user interface of a managed viewer application 145, which is rendered for display on a client device 109. The managed viewer application 145 can view a protected image 151. The protected image 151 is shown including an obscured protected image area 706. For example, the managed viewer application 145 can determine that an account of a viewer or user of the managed viewer application 145 is unauthorized to view the protected image area 706, so the protected image area 706 can remain obscured. However, if the managed viewer application 145 determines that an account of a viewer or user of the managed viewer application 145 is authorized to view the protected image area 706, then the managed viewer application 145 can show an unobscured protected image area 706.

Figure 7B:
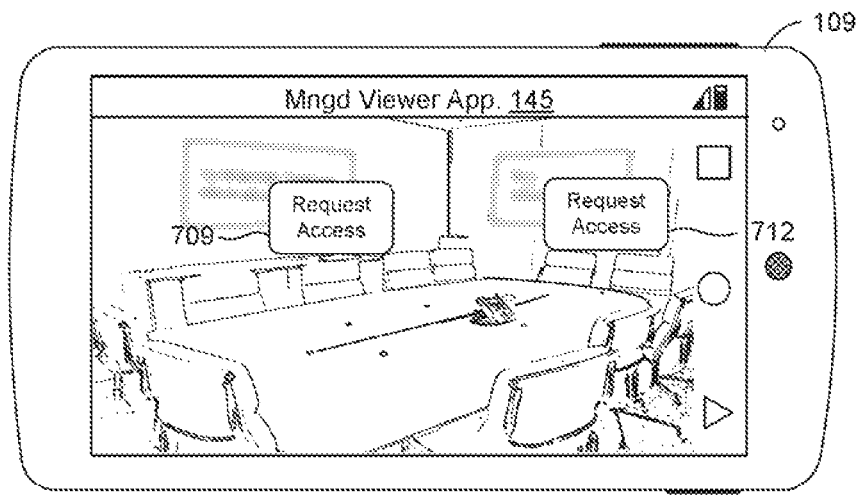

FIG. 7B illustrates another example of a user interface of a managed viewer application 145, which is rendered for display on a client device 109. The managed viewer application 145 can view a protected image 151. The protected image 151 is shown including multiple obscured protected image areas. Each can have the same or different protection level. In this example, the user account of a viewing user can be unauthorized based on permissions, and both protected image areas are obscured. The managed viewer application 145 can generate user interface elements 709 and 712, which can be selected to request approval to view the protected image areas despite the lack of permissions. In some cases, a single user interface element can be provided to request access to all protected image areas of the protected image 151. When selected, a notification can be transmitted to the management service 120 and a client device 109 of an administrative user. If approval is obtained, the managed viewer application 145 can reproduce the protected image areas unobscured.

For example, the managed viewer application 145 can determine that an account of a viewer or user of the managed viewer application 145 is unauthorized to view the protected image area 706, so the protected image area 706 can remain obscured. However, if the managed viewer application 145 determines that an account of a viewer or user of the managed viewer application 145 is authorized to view the protected image area 706, then the managed viewer application 145 can show an unobscured protected image area 706.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109, and devices including the management system 106 can include a display upon which user interfaces can be rendered. The client devices 109, and devices including the management system 106 can also include one or more input/output devices that can include, for example, a capacitive touchscreen or other type of touch input device, fingerprint reader, or keyboard.

Although the various services, applications, agents, and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system for performing actions using augmented reality, the system comprising:
   a client device; and
   a data store comprising instructions executable by the client device, wherein the instructions, when executed, cause the client device to at least:
      generate, by a managed camera application executed by the client device, an augmented reality (AR) camera user interface based at least in part on image data comprising a field of view of a camera of the client device;
      detect, by the managed camera application, an indoor position using at least one of a global positioning system (GPS) device, a visual positioning system (VPS) device, a Bluetooth device, a WiFi device, a visible light communication (VLC) device, and a LiFi device, the indoor position comprising a location and an orientation of the client device;
      identify, by the managed camera application, a protected image area in the field of view of the camera, wherein the protected image area depicts a protected object defined within image protection rules for an enterprise; and
      update, by the managed camera application, the AR camera user interface to include at least one AR user interface element comprising a repositioning indicator that is generated to indicate a direction to move the camera based on at least one of: identification that the direction minimizes a change of angle that eliminates the protected image area from the field of view of the camera, and identification that the direction maximizes a reduction of an amount of the protected image area in the field of view.

2. The system of claim 1, wherein the instructions, when executed, further cause the client device to at least:
   capture, by the managed camera application, an image that omits or obscures the protected image area, wherein the managed camera application enforces protected image areas to be omitted or obscured within unencrypted image data of the image.

3. The system of claim 1, wherein the instructions, when executed, further cause the client device to at least:
   transmit, by the managed camera application, the image data and the indoor position to a management service; and
   receive, by the managed camera application, data comprising an identification of the protected image area in the field of view of the camera.

4. The system of claim 1, wherein the instructions, when executed, further cause the client device to at least:
   analyze, by the managed camera application, at least one of the image data and the indoor position to identify the protected image area in the field of view of the camera.

5. The system of claim 1, wherein the at least one AR user interface element indicates or obscures the protected image area in the field of view of the camera.

6. The system of claim 1, wherein the at least one AR user interface element comprises an indication of a protection level required to view and capture the protected image area.

7. The system of claim 1, wherein the AR camera user interface disables image capture based on the protected image area being identified in the field of view of the camera.

8. A non-transitory computer-readable medium embodying instructions executable by a client device, wherein the instructions, when executed, cause the client device to:
   generate, by a managed camera application executed by the client device, an augmented reality (AR) camera user interface based at least in part on image data comprising a field of view of a camera of the client device;
   detect, by the managed camera application, an indoor position using at least one of a global positioning system (GPS) device, a visual positioning system (VPS) device, a Bluetooth device, a WiFi device, a visible light communication (VLC) device, and a LiFi device, the indoor position comprising a location and an orientation of the client device;
   identify, by the managed camera application, a protected image area in the field of view of the camera, wherein the protected image area depicts a protected object defined within image protection rules for an enterprise; and
   update, by the managed camera application, the AR camera user interface to include at least one AR user interface element comprising a repositioning indicator that is generated to indicate a direction to move the camera based on at least one of: identification that the direction minimizes a change of angle that eliminates the protected image area from the field of view of the camera, and identification that the direction maximizes a reduction of an amount of the protected image area in the field of view.

9. The non-transitory computer-readable medium of claim 8, wherein the instructions, when executed, further cause the client device to at least:
   capture, by the managed camera application, an image that omits the protected image area, wherein the managed camera application enforces protected image areas to be omitted within unencrypted image data of the image.

10. The non-transitory computer-readable medium of claim 8, wherein the instructions, when executed, further cause the client device to at least:
    transmit, by the managed camera application, the image data and the indoor position to a management service; and
    receive, by the managed camera application, data comprising an identification of the protected image area in the field of view of the camera.

11. The non-transitory computer-readable medium of claim 8, wherein the instructions, when executed, further cause the client device to at least:
    analyze, by the managed camera application, at least one of the image data and the indoor position to identify the protected image area in the field of view of the camera.

12. The non-transitory computer-readable medium of claim 8, wherein the at least one AR user interface element indicates or obscures the protected image area in the field of view of the camera.

13. The non-transitory computer-readable medium of claim 8, wherein the at least one AR user interface element comprises an indication of a protection level associated with the protected image area.

14. The non-transitory computer-readable medium of claim 8, wherein the AR camera user interface disables image capture based on the protected image area being identified in the field of view of the camera.

15. A computer-implemented method comprising:
generating, by a managed camera application executed by a client device, an augmented reality (AR) camera user interface based at least in part on image data comprising a field of view of a camera of the client device;
detecting, by the managed camera application, an indoor position using at least one of a global positioning system (GPS) device, a visual positioning system (VPS) device, a Bluetooth device, a WiFi device, a visible light communication (VLC) device, and a LiFi device, the indoor position comprising a location and an orientation of the client device;
identifying, by the managed camera application, a protected image area in the field of view of the camera, wherein the protected image area depicts a protected object defined within image protection rules for an enterprise; and
updating, by the managed camera application, the AR camera user interface to include at least one AR user interface element comprising a repositioning indicator that is generated to indicate a direction to move the camera based on at least one of: identification that the direction minimizes a change of angle that eliminates the protected image area from the field of view of the camera, and identification that the direction maximizes a reduction of an amount of the protected image area in the field of view.

16. The computer-implemented method of claim 15, further comprising:
capturing, by the managed camera application, a protected image that obscures the protected image area, wherein the managed camera application enforces protected image areas to be obscured within unencrypted image data of the protected image.

17. The computer-implemented method of claim 15, further comprising:
transmitting, by the managed camera application, the image data and the indoor position to a management service; and
receiving, by the managed camera application, data comprising an identification of the protected image area in the field of view of the camera.

18. The computer-implemented method of claim 15, further comprising:
analyzing, by the managed camera application, at least one of the image data the indoor position to identify the protected image area in the field of view of the camera.

19. The computer-implemented method of claim 15, wherein the at least one AR user interface element indicates or obscures the protected image area in the field of view of the camera.

20. The computer-implemented method of claim 15, wherein the at least one AR user interface element comprises an indication of a protection level associated with the protected image area.

* * * * *